Jan. 16, 1962 R. A. DEIBEL 3,016,558
WINDSHIELD WIPER ARRANGEMENT
Filed Nov. 2, 1956 2 Sheets-Sheet 2
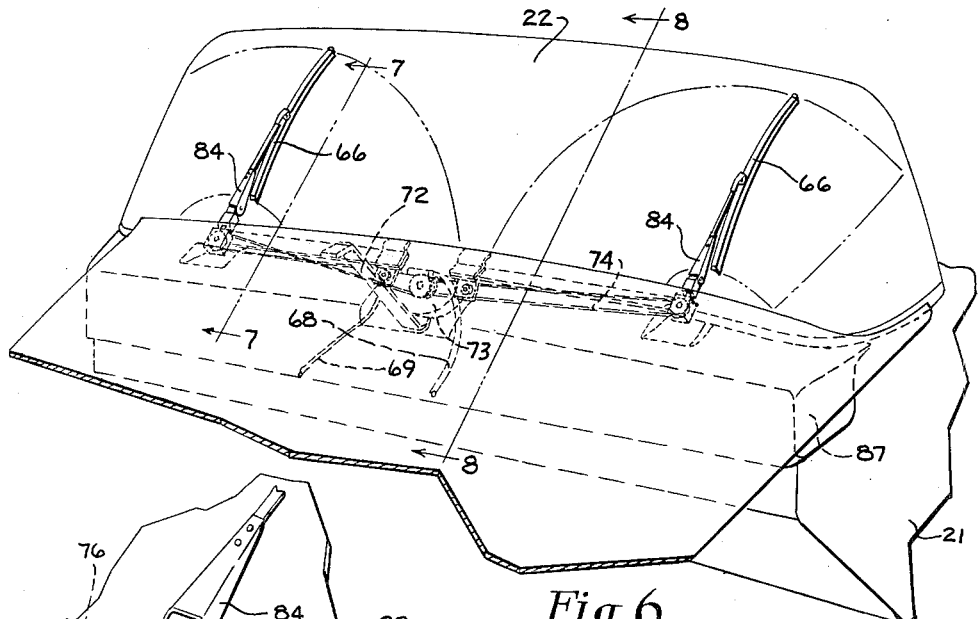
Fig. 6
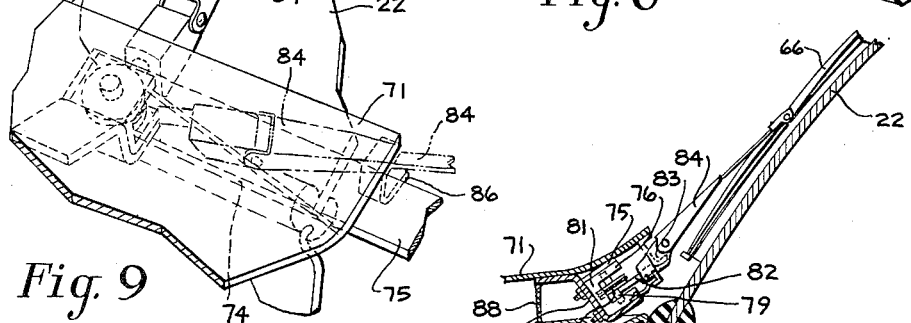
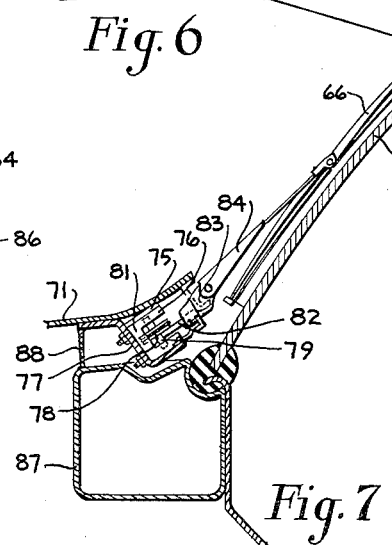
Fig. 7
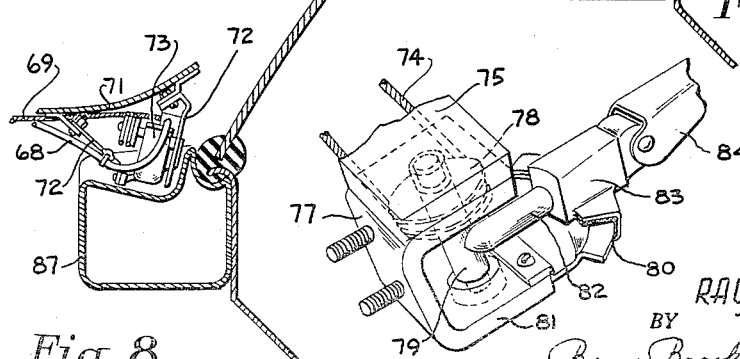
Fig. 8
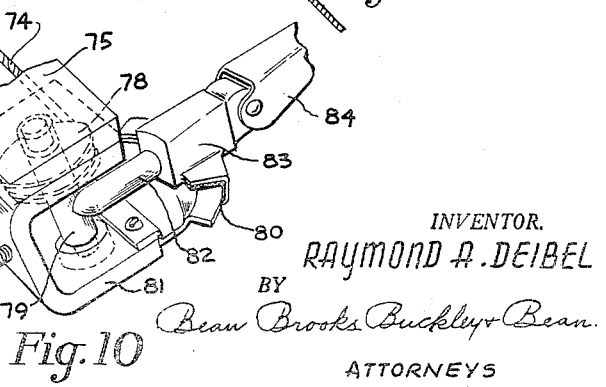
Fig. 10
INVENTOR.
RAYMOND A. DEIBEL
BY
Bean Brooks Buckley & Bean.
ATTORNEYS United States Patent Office 3,016,558
Patented Jan. 16, 1962

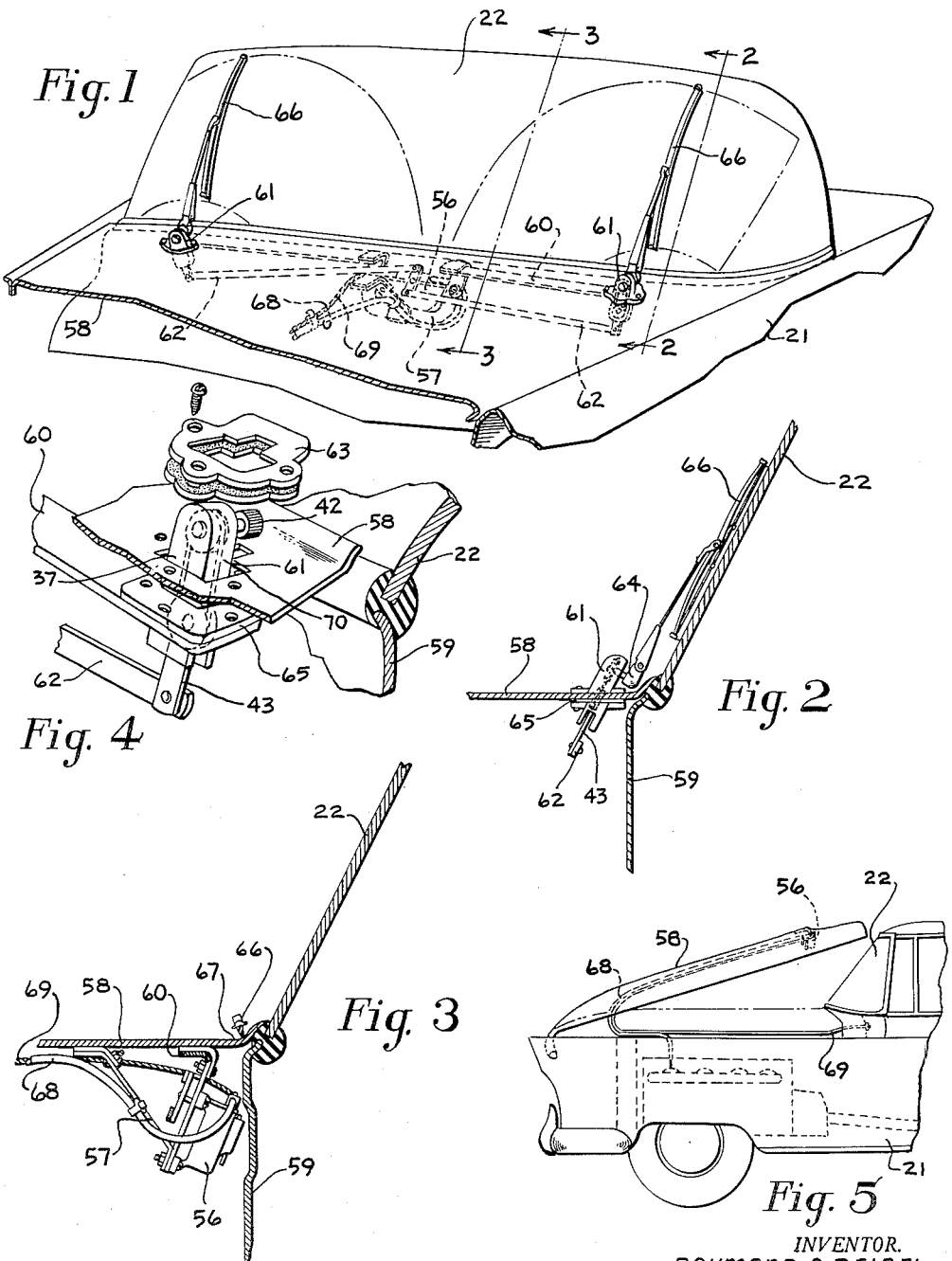

3,016,558
WINDSHIELD WIPER ARRANGEMENT
Raymond A. Deibel, Cheektowaga, N.Y., assignor to Trico Products Corporation, Buffalo, N.Y.
Filed Nov. 2, 1956, Ser. No. 620,079
3 Claims. (Cl. 15—250.16)

This invention relates to vehicle windshield wiper arrangements, and more particularly to a windshield wiper arrangement for use on vehicles in which the engine hood is pivoted for rotary movement about a point at the front of the engine compartment, or along the side thereof.

In motor vehicles of contemporary design, it is general practice to provide access to the engine compartment by pivoting the hood at its rear end for rotary movement in the direction of the windshield. However, engine hood arrangements have been proposed, and utilized, wherein the hood is pivoted at its forward end, or along either side. The present invention is for use on vehicles having the latter type of hood arrangement, and in particular where a proportionate increase in the size of the engine compartment has been achieved by setting back the firewall. Such modifications in conventional motor vehicle design i.e., front pivoted hood, and engine compartment enlargement, create problems in the satisfactory location of the windshield wiper motor and associated mechanism, which problems are solved by application of the principles of the present invention.

The main object of this invention is to provide a windshield wiper arrangement for use on motor vehicles having a hood pivoted at its forward end, or along either side.

Another object is to provide a windshield wiper arrangement for use on motor vehicles wherein a proportionate increase in the size of the engine compartment has been achieved by setting back the firewall.

Still another object of the invention is to provide a windshield wiper arrangement that is easy to install and service, and which will provide long and satisfactory operation.

These and further objects and features of the invention will become more apparent from the following description and the accompanying drawings wherein;

FIG. 1 is a fragmentary perspective view of a motor vehicle having a modified form of windshield wiper arrangement embodying the principles of the invention;

FIG. 2 is a section view, slightly enlarged, as seen from line 2—2 in FIG. 1;

FIG. 3 is a section view, slightly enlarged, as seen from line 3—3 in FIG. 1;

FIG. 4 is an enlarged exploded perspective view of a wiper drive shaft assembly used in the arrangement shown in FIG. 1;

FIG. 5 is a view of a portion of a motor vehicle having a wiper arrangement as shown in FIG. 1;

FIG. 6 is a fragmentary perspective view of a motor vehicle having another modified form of windshield wiper arrangement embodying the principles of the invention;

FIG. 7 is a section view, slightly enlarged, as seen from line 7—7 in FIG. 6;

FIG. 8 is a section view, slightly enlarged, as seen from line 8—8 in FIG. 6;

FIG. 9 is an enlarged fragmentary view of a wiper drive shaft assembly used in the arrangement shown in FIG. 6; and FIG. 10 is a fragmentary perspective view of the wiper drive shaft assembly used in the arrangement shown in FIG. 6.

Referring now to the drawings and more particularly to FIG. 1, the numeral 21 identifies the body portion of a motor vehicle having a windshield 22 of the type currently known as the wrap-around style. The windshield wiper arrangement illustrated embodies the principles of the invention as applied to a motor vehicle wherein the engine compartment has been enlarged by moving a firewall 59 rearwardly toward the passenger compartment. Such a vehicle engine compartment design reduces the space behind the instrument panel which is normally used for installation of the wiper motor and associated parts. The windshield wiper arrangement includes a wiper motor 56 supported by bracket 57 secured to the underside of the hood 58 near the rear end thereof, a pair of drive shaft assemblies 61 which are arranged to project through the hood on each side of the wiper motor, and link members 62 which interconnect the wiper motor and the drive shaft assemblies. Assembly 61 has a flange 65 formed integral with a housing 37, whereby the assembly 61 may be secured to the hood at an angle as shown. Each assembly 61 is affixed to a bar member 60, the opposite end of the bar member being affixed to the motor bracket 57, thereby providing a unitized assembly i.e., wiper motor 56 and drive shaft assembly 61, which unitized assembly contributes to convenient and efficient mounting of the wiper arrangement to the hood. A cover plate 63 is adapted to closely fit about the assembly 61 on the top of the hood to cover the edges of the opening 70 through which the assembly projects, said cover plate also providing further support to the assembly 61.

A wiper arm mounting head 64 is affixed to the end of the drive shaft 42 of each assembly 61, for the support of an arm including a wiper blade 66 arranged for reciprocal movement upon the windshield 22. The arrangement of each drive shaft assembly 61 is such as to cause parking of the wiper blade 66 in a valley 67 formed by the upturned end of the hood 58, as best seen in FIG. 3. In such manner, the wiper blade is given support when in parked position, thus avoiding damage which may be caused during raising of the hood when necessary to gain access to the engine compartment. A wiper motor power supply conduit 68 may be secured to the underside of the hood 58, said conduit extending forwardly for connection to a power source viz, vacuum, compressed air, or electricity, depending upon the type of wiper motor being utilized; a motor control cable 69 may be arranged in like manner under the hood, which cable will terminate in a control knob (not shown) arranged for convenient manipulation by the vehicle operator.

From the foregoing it will be seen that wiper motor operation causes reciprocal movement of the link members 62, which movement is transmitted via drive shaft assemblies 61 to the wiper blades to cause wiping of the windshield. The means is thus provided wherein the problem of windshield wiper installation is solved for vehicles having a hood pivotally affixed to the forward end of the engine compartment. It will also be apparent that the disclosed wiper arrangement may be readily applied to a motor vehicle in which the hood is pivoted along either edge, the only change required being a slight rearrangement of the motor power conduit and the control cable.

The windshield wiper arrangement shown in FIGS. 6 to 10, while similar to that described above wherein the arrangement is affixed to the underside of the hood, differs insofar as no part of the wiper arrangement is visible from the vehicle exterior when the hood is closed and the wiper blades are parked.

To accomplish such an out-of-sight wiper arrangement, the vehicle 21 has a hood 71 the forward end of which is pivoted to the front end of the engine compartment, and the rear end of which is curved upwardly and in spaced relation to a major portion of the windshield 22. Affixed to a bracket 72 secured to and at the mid-section of the hood, is a wiper motor 73 which is connected by cables 74 to drive shaft assemblies 76 located at each side of the wiper motor, which assemblies are affixed to brackets 77 secured to the underside of the hood. A bar member 75 is affixed to each of the brackets 72 and 77 to thus provide a unitized arrangement including the wiper motor and the drive shaft assemblies. The drive shaft assembly 76 includes a pulley 78 mounted upon a shaft 79 the ends of which are rotatably supported in a housing 81 affixed to the bracket 77 and the rod member 75. A pin member 82 is affixed at one end normal to the shaft 79, the other end of the pin member having a wiper arm mounting head 83 pivotally secured thereon. The mounting head pivotally supports a wiping arm assembly 84, which includes wiper blade 66 positioned for wiping action upon the windshield 22. A cam arrangement 80 may be arranged between the housing 81 and the wiper arm mounting head 83 whereby the wiper blade is maintained normal to the windshield as it reciprocates thereupon; further description of such cam assembly may be found in the patent to J. R. Oishei et al., No. 2,691,186. A bracket 86, secured to the underside of the hood 71, is arranged to receive the wiper arm assembly 84 during wiper motor parking to maintain the wiper arm assembly in position and out-of-sight underneath the hood.

The wiper assembly may be used in motor vehicles having a ventilating duct such as the duct 87 shown; however, in such case, the duct should be recessed to provide clearance for the wiper motor and drive shaft assemblies, as well as the power transmission means arranged therebetween. In addition, enclosure means such as a wire guard 88 may be arranged to prevent debris and other extraneous matter from entering the engine compartment by way of the space between the hood and the windshield.

It will be seen from the foregoing that the windshield wiping arrangement provides a practical manner for maintaining windshield wiper blades out-of-sight and ready for instant starting whenever windshield wiping is required. In addition to contributing to the smooth line styling of the vehicle, such out-of-sight wiper arrangement assures protection to the wiper blades since they are exposed to the elements only when being used.

The foregoing description has been given in detail without thought of limitation since the inventive principles involved are capable of assuming other physical embodiments without departing from the spirit of the invention and the scope of the appended claims.

What is claimed is:

1. A windshield wiper arrangement for use on a motor vehicle having a hood pivoted at the forward end of the engine compartment with the rear edge of the hood lifting forwardly from the windshield, comprising, in combination therewith, a wiper motor affixed to the underside of the hood near the rear edge thereof, and a wiper and drive shaft assembly affixed to the under rear edge portion of the hood, power transmission means drivingly connecting the drive shaft assembly to the wiper motor, said motor and said drive shaft assembly being affixed to said hood for movement therewith about the forwardly disposed pivot axis thereof, a power line extending across the hood pivot and connecting the motor to a power source in the compartment, and means carried by said hood and supporting said wiper when the latter is in parked position.

2. In combination in a motor vehicle having a windshield and a compartment hood adjacent thereto which is hinged at a location remote from said windshield to cause the edge of said compartment hood adjacent said windshield to swing away therefrom when said hood is opened, a windshield wiper assembly comprising a wiper motor mounted on said hood proximate said edge, wiper drive shafts mounted on said hood on each side of said motor and spaced therefrom, linkage means coupling said drive shafts to said motor, wiper arms mounted on said drive shafts, wipers carried by said wiper arms, and means on said hood for permitting the wipers to move therefrom onto the windshield when said windshield wiper motor is placed in operation and for permitting said wipers to move onto said hood from said windshield when said wiper motor is placed in a parked position, whereby said wipers, wiper arms, wiper motor, drive shafts and wiper linkage travel with said hood when the latter is moved to an open position.

3. In a motor vehicle, a windshield wiper arrangement including a wiper motor affixed to the underside of the vehicle hood in the mid-portion near the rear edge thereof, drive shaft assemblies affixed to the underside of the hood on each side of the wiper motor, each drive shaft assembly including a pulley supported upon a rotatable shaft, a pin member affixed normal to the shaft, and a wiper arm mounting head supported upon the end of said pin member, cables drivingly connecting the wiper motor to each pulley, a wiper blade assembly pivotally connected to each mounting head and including a wiper blade adapted to be reciprocated upon the vehicle windshield, and means affixed to the underside of the hood adapted to support each wiper blade assembly under said hood when the wiper motor is in parked condition.

References Cited in the file of this patent
UNITED STATES PATENTS

| | | |
|---|---|---|
| 2,184,086 | Saunders | Dec. 19, 1939 |
| 2,206,822 | Rousseau | June 2, 1940 |
| 2,252,350 | Paulus | Aug. 12, 1941 |
| 2,691,186 | Oishei et al. | Oct. 12, 1954 |

FOREIGN PATENTS

| | | |
|---|---|---|
| 1,089,413 | France | Sept. 29, 1954 |